United States Patent [19]
Geerlings

[11] Patent Number: 6,147,829
[45] Date of Patent: *Nov. 14, 2000

[54] MAGNETIC TAPE WITH A TRACK CONFIGURATION AND APPARATUS FOR COOPERATION WITH SUCH A MAGNETIC TAPE

[76] Inventor: Jurgen H. T. Geerlings, 47 Ambrose Road, Tadley, Hampshire RG26 6JS, United Kingdom

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/977,259

[22] Filed: Nov. 24, 1997

Related U.S. Application Data

[63] Continuation of application No. 08/540,521, Oct. 10, 1995, abandoned.

[30] Foreign Application Priority Data

Oct. 31, 1994 [AT] Austria ..................................... 2030/94

[51] Int. Cl.[7] .................................................. G11B 15/18
[52] U.S. Cl. ........................... 360/69; 360/70; 360/73.13; 360/73.12; 386/100; 386/104; 386/96
[58] Field of Search ................................. 360/10.2, 10.3, 360/73.09, 73.11, 73.12, 73.13, 70, 72.2, 69; 386/100, 104, 96, 39

[56] References Cited

U.S. PATENT DOCUMENTS

| | | | |
|---|---|---|---|
| 4,611,252 | 9/1986 | Igata | 360/70 X |
| 4,656,537 | 4/1987 | Toba | 360/10.3 X |
| 4,935,826 | 6/1990 | Sin et al. | 360/77.13 |
| 5,251,078 | 10/1993 | Aki | 360/72.2 |
| 5,335,116 | 8/1994 | Onishi | 360/9.1 |
| 5,381,280 | 1/1995 | Lee | 360/69 X |
| 5,430,579 | 7/1995 | Onishi | 360/9.1 |
| 5,563,745 | 10/1996 | Kim | 360/18 |
| 6,055,358 | 4/2000 | Traximayn . | |

FOREIGN PATENT DOCUMENTS 290453  11/1993  Japan ................................. 360/73.13

OTHER PUBLICATIONS

"Modified CTL Pulse, So As to Inhibit Tracking in a VHS–VCR" Research Disclosure, Dec. 1994, p. 691.

*Primary Examiner*—Alan T. Faber
*Attorney, Agent, or Firm*—Michael E. Belk

[57] ABSTRACT

A magnetic tape (2) and an apparatus (1) for cooperation with this magnetic tape (2) are configured in such a manner that video signals and audio signals can be stored in an inclined-track zone (67) and that a control signal (D-CTL signal) can be stored in a control signal track (26) on the magnetic tape (2), for which the length L(D) of a recorded signal period is equal to the value, divided by N, of the distance D(D) in the longitudinal direction (3) of the tape between two inclined tracks (63) which can be scanned by the same magnetic head (D3), the control signal (D-CTL signal) being reproduced from the control signal track (26) when such a magnetic tape (2) is loaded into a video recorder (1) in accordance with the VHS standard or into a video recorder (1) in accordance with the invention, which is also capable of recording and reproducing analog video signals in accordance with the VHS standard, which reproduced control signal is applied to a speed control device for a capstan, which results in a tape speed deviating from normal operation and precludes undesirable signal reproduction.

7 Claims, 4 Drawing Sheets

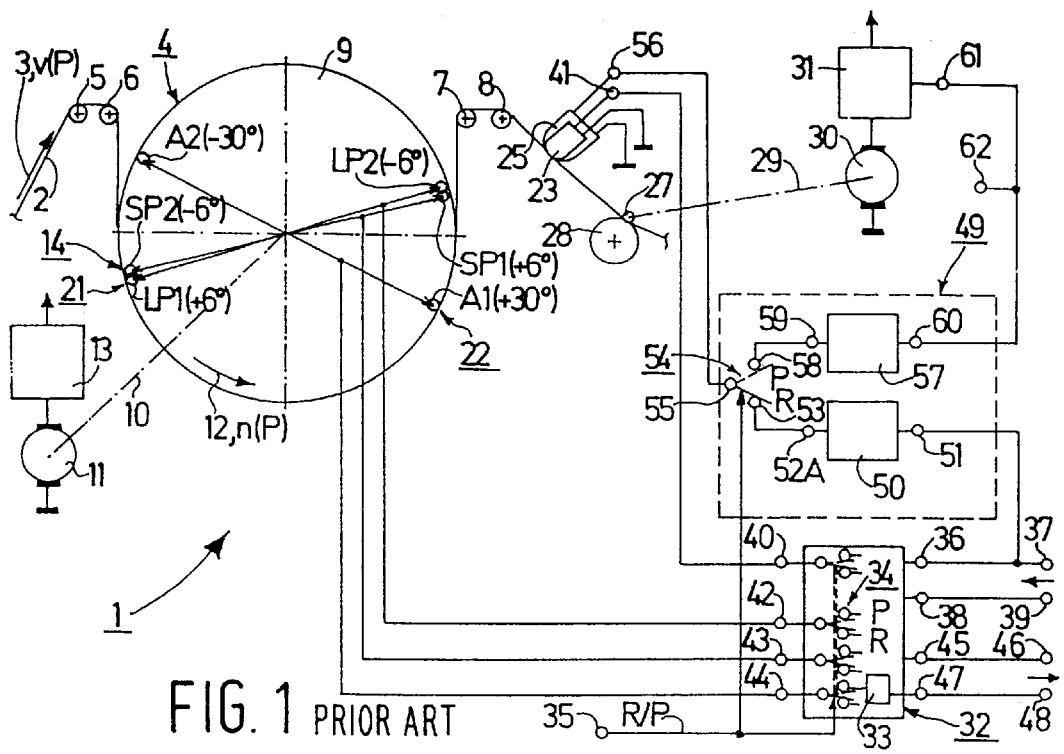
FIG. 1 PRIOR ART
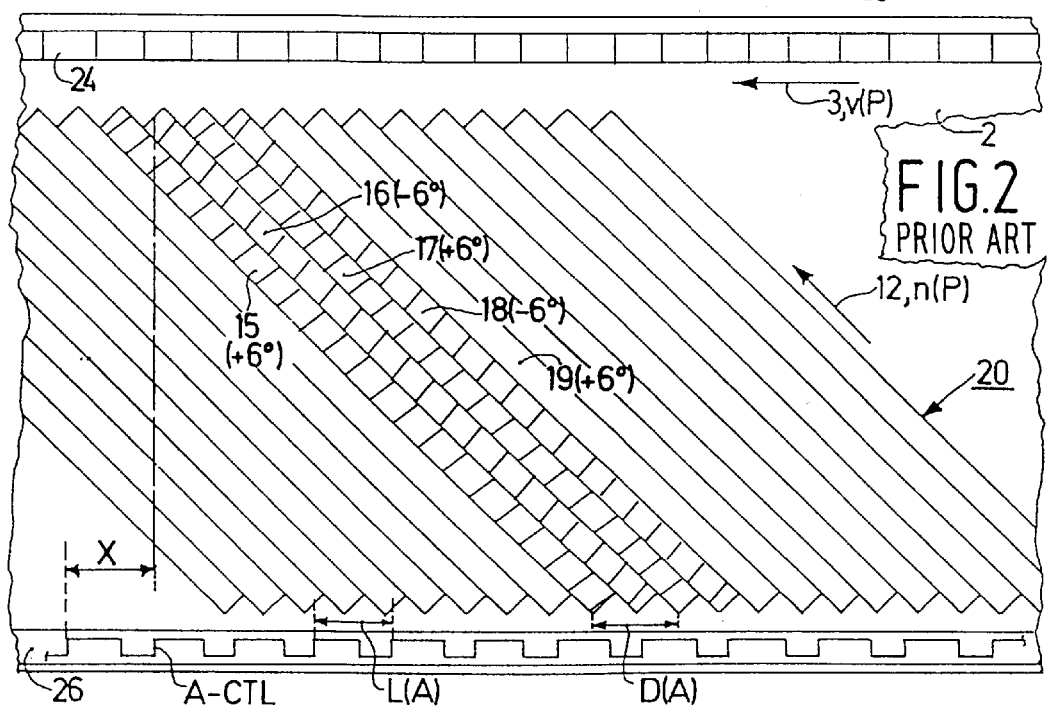
FIG. 2 PRIOR ART
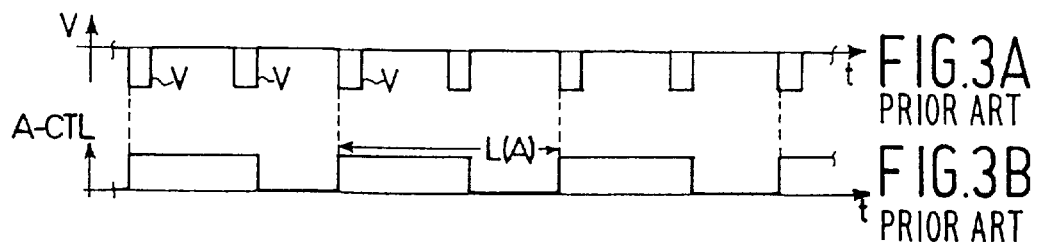
FIG. 3A PRIOR ART
FIG. 3B PRIOR ART

MAGNETIC TAPE WITH A TRACK CONFIGURATION AND APPARATUS FOR COOPERATION WITH SUCH A MAGNETIC TAPE

This is a continuation of application Ser. No. 08/540,521, filed Oct. 10, 1995, now abandoned.

BACKGROUND OF THE INVENTION

1. Field of the Invention

The invention relates to a magnetic tape provided with a track configuration comprising a track zone with adjacent inclined tracks, which extend obliquely relative to the longitudinal direction of the tape, which can be scanned by means of rotationally drivable magnetic heads and which serve to store information signals, and a control signal track, which extends in the longitudinal direction of the tape and is adjacent to the track zone and in which a control signal can be stored, the length of a recorded signal period of said control signal being proportional to the distance in the longitudinal direction of the tape between two inclined tracks which can be scanned by the same magnetic head, and each signal edge of said control signal being associated with an inclined track.

The invention also relates to an apparatus for cooperation with a magnetic tape of the type defined in the first paragraph, which apparatus is adapted to record signals on the magnetic tape and comprises rotationally drivable magnetic heads for scanning the inclined tracks on the magnetic tape, a stationary magnetic head for scanning the control track on the magnetic tape, and a control signal generation device adapted to generate and supply at least one control signal to be recorded in the control signal track on the magnetic tape, the length of a recorded signal period of said control signal being proportional to the distance in the longitudinal direction of the tape between two inclined tracks which can be scanned by the same magnetic head, and each signal edge of said control signal being associated with an inclined track, the control signal generation device having an output for supplying the control signal to be recorded.

The invention further relates to an apparatus for cooperation with a magnetic tape of the type defined in the first paragraph, which apparatus is adapted to reproduce signals from the magnetic tape and comprises rotationally drivable magnetic heads for scanning the inclined tracks on the magnetic tape, a stationary magnetic head for scanning the control track on the magnetic tape, and a control signal processing device adapted to receive and process at least one control signal reproduced from the magnetic tape and having at least one input for receiving said reproduced control signal and at least one output for supplying a processed control signal.

2. Description of the Related Art

A magnetic tape of the type defined in the first paragraph, an apparatus of the type defined in the second paragraph, and an apparatus of the type defined in the third paragraph are known, for example, particularly from the magnetic-tape-cassettes and magnetic-tape video recorders in accordance with the VHS standard which are on the market practically all over the world. In accordance with this standard, information signals, in the form of analog video signals and, if desired, analog audio signals, can be stored or have been stored in the inclined tracks of a magnetic tape. In a first longitudinal track which extends in the longitudinal direction of the tape, which track is intended for the storage of further information signals, analog audio signals can be stored or have been stored as further information signals. In a second longitudinal track, which also extends in the longitudinal direction of the tape, a control signal of a given frequency $f_1$ can be stored or has been stored, which control signal is generally referred to as a CTL signal and, in accordance with the VHS standard, is formed by a square-wave signal. This CTL signal is basically generated in relation to the vertical synchronization pulses of an analog video signal to be recorded in the inclined tracks, in such a manner that it has a frequency value $f_1$ which bears a given relationship to the value of the picture frequency. The frequency $f_1$ is equal to half the frequency of the vertical synchronization pulses. The length of a recorded signal period of the CTL signal is equal to the distance in the longitudinal direction of the tape between two inclined tracks which can be scanned with the same rotationally drivable magnetic head. Each rising edge of the CTL signal is assigned to a given inclined track, namely to an inclined track in which the signals have been recorded with a given azimuth angle, i.e., an azimuth angle of −6°. During the reproduction of recorded video signals, the CTL signal recorded in the second longitudinal track serves as frequency and phase information for a speed control device for controlling the speed of a drive motor for a capstan to drive the magnetic tape with a constant tape speed, and also as information when each of at least two rotationally drivable magnetic heads for scanning the inclined tracks enters into or is in scanning contact with an inclined track. During reproduction of video signals stored in the inclined tracks, the likewise reproduced CTL signal is applied to the speed control device for the capstan motor, the frequency of the CTL signal being compared with a nominal value to control the speed of the capstan motor, depending on the result of the comparison, in such a manner that the video signals and, if present, audio signals stored in the inclined tracks are scanned and reproduced properly and in a faultless manner by means of the rotationally drivable magnetic heads.

The Applicant has started the development of a new video recorder system for recording and reproducing video signals and audio signals on/from magnetic tapes in accordance with the VHS standard, which system enables not only analog video signals and analog audio signals but also digital video signals and digital audio signals to be stored in the inclined tracks. This new video recorder system is described, for example, in the nonpublished Austrian Patent Applications filed under numbers A 1555/94 and A 1971/94, herewith incorporated by reference. When, by means of this new video recorder system a CTL signal is recorded in the second longitudinal track in a manner in accordance with the VHS standard, the problem arises that in the case that a magnetic tape, on which digital video signals and digital audio signals have been stored in the inclined tracks and the CTL signal associated with these digital signals has been stored in the second longitudinal track, is loaded into a known video recorder in accordance with the VHS standard, the magnetic tape is driven with a tape speed corresponding to the stored CTL signal and influenced by this CTL signal, the digital video signals and digital audio signals stored in the inclined tracks then being reproduced by the rotationally drivable magnetic heads of the known video recorder which is constructed in accordance with the VHS standard. However, such a known video recorder in accordance with the VHS standard is not constructed for a proper and faultless processing of these digital signals. An undesirable consequence of this is that the digital video signals and digital audio signals reproduced by means of the rotationally drivable magnetic heads are also applied to the audio signal processor of the known VHS video recorder, in which the digital signals may be processed as analog audio signals, which may result in an undesirable and annoying acoustic reproduction.

SUMMARY OF THE INVENTION

It is an object of the invention to preclude the above-mentioned problems with a magnetic tape of the type defined in the first paragraph. To achieve this object, according to the invention, a magnetic tape of the type defined in the first paragraph is characterized in that in the control signal track, a control signal has been stored of which a recorded signal period has a length equal to the value of said distance in the longitudinal direction of the tape between two inclined tracks which can be scanned by the same magnetic head, divided by N, N being an integer greater than 1. In this way it is achieved that when a magnetic tape in accordance with the invention with a control signal in accordance with the invention is loaded into a known VHS video recorder, the control signal in accordance with the invention stored in the second longitudinal track but recorded with a higher frequency than the frequency of a normal CTL signal is reproduced by means of the stationary second magnetic head provided in such recorders in order to scan this second longitudinal track on the magnetic tape. The reproduced control signal in accordance with the invention is then applied to the speed control device for the capstan motor of a known VHS video recorder and is compared in frequency with a nominal value corresponding to the frequency of a normal CTL signal, due to which the capstan for the transport of the magnetic tape is driven with an incorrect, i.e., too low, speed, resulting in too low a tape speed. Since the tape speed is too low the rotationally drivable magnetic heads of a known VHS video recorder will reproduce the digital video signals and digital audio signals stored on a magnetic tape in such a fragmentary manner that reproduced digital signals will appear discontinuously, thereby simply enabling an annoying acoustic reproduction of these digital signals to be avoided.

An advantageous embodiment of a magnetic tape in accordance with the invention is characterized in that in the control signal track, a control signal has been stored, for which a given signal edge associated with a given inclined track has been marked by a signal marking in a signal period following the given signal edge. This has proved to be very favorable and advantageous in practice. This is particularly so because in this manner, it is comparatively simple, by detection of a signal marking, to find the inclined track associated with the signal edge preceding the detected signal marking and bring it in a desired relative position with respect to the rotationally drivable magnetic heads. Such a process can be used advantageously for reproducing digital video signals and digital audio signals from the inclined tracks in a so-called trick-play mode (also referred to as feature mode) in which the magnetic tape is driven with a reproducing tape speed which deviates from the recording tape speed, because in such a trick-play mode, the rotationally drivable magnetic heads are moved along trick-play scanning tracks which intersect a plurality of inclined tracks but each of which trick-play scanning tracks should be in a given relative position with respect to the inclined tracks and, for example, should begin at the beginning of a given inclined track. In the case of a magnetic tape in accordance with the invention, provided with the control signal in accordance with the invention, each of said given inclined tracks at whose beginning a trick-play scanning track should start can be associated with a signal marking provided in the control signal, by means of which marking each of these given inclined tracks can be found in a trick-play mode.

A particularly advantageous embodiment of such a magnetic tape in accordance with the invention is characterized in that in the control signal track, a control signal has been stored, for which the signal marking is formed by an additional signal edge. This is advantageous for a simple and reliable detection of such signal markings.

According to the invention, an apparatus of the type defined in the second paragraph is characterized in that the control signal generation device is adapted to generate a control signal for which the length of a recorded signal period is equal to the value of said distance in the longitudinal direction of the tape between two inclined tracks which can be scanned by the same magnetic head, divided by N, N being an integer greater than 1, and in that in a given recording mode of the apparatus, the control signal generation device has its output for supplying said control signal connected to the stationary magnetic head for recording this control signal in the control signal track on the magnetic tape. By means of such an apparatus, it is possible to obtain a magnetic tape in accordance with the invention with a control signal in accordance with the invention in a simple manner and with minimal expenditure.

An advantageous embodiment of such an apparatus in accordance with the invention is characterized in that the control signal generation device is adapted to generate a control signal for which a given signal edge associated with a given inclined track has been marked by a signal marking in a signal period following the given signal edge. This has proved to be very advantageous and favorable in practice. This is particularly so because in this manner, it is comparatively simple, by detection of a signal marking, to find the inclined track associated with the signal edge preceding the detected signal marking and bring it in a desired relative position with respect to the rotationally drivable magnetic heads. Such a process can be used advantageously for reproducing digital video signals and digital audio signals from the inclined tracks in a so-called trick-play mode (also referred to as feature mode) in which the magnetic tape is driven with a reproducing tape speed which deviates from the recording tape speed, because in such a trick-play mode, the rotationally drivable magnetic heads are moved along trick-play scanning tracks which intersect a plurality of inclined tracks, but each of which trick-play scanning tracks should be in a given relative position with respect to the inclined tracks and, for example, should start at the beginning of a given inclined track. In the case of a magnetic tape in accordance with the invention, provided with the control signal in accordance with the invention, each of said given inclined tracks at whose beginning a trick-play scanning track should start can be associated with a signal marking provided in the control signal, by means of which marking it is possible to locate each of these given inclined tracks in a trick-play mode.

A particularly advantageous embodiment of such an apparatus in accordance with the invention is characterized in that the control signal generation device is adapted to generate a control signal for which the signal marking is formed by at least one additional signal edge. This is advantageous for a simple and reliable detection of such signal markings.

According to the invention, an apparatus of the type defined in the third paragraph is characterized in that the apparatus comprises a frequency divider and in that in a given reproduction mode of the apparatus, in which the stationary magnetic head is connected to the control signal processing device to receive a control signal reproduced from the control signal track on the magnetic tape, the frequency divider is connected after the output for supplying the processed control signal, processed by the control signal processing device. Such an apparatus enables digital video signals and digital audio signals recorded on a magnetic tape in accordance with the invention to be reproduced correctly in the given reproduction mode.

A particularly advantageous embodiment of such an apparatus in accordance with the invention is characterized in that the apparatus comprises a detection device having an input and at least one output, in that in said given reproduction mode of the apparatus, the stationary magnetic head is connected to the input of the detection device, and in that the detection device is adapted to detect the presence of the control signal reproduced from the control signal track on the magnetic tape by means of the stationary magnetic head in said given reproduction mode and to generate detection information upon detection of the presence of the reproduced control signal. By means of such an apparatus, it can be determined simply whether, on the magnetic tape, recordings of digital video signals and digital audio signals have been stored which are not in accordance with the VHS standard. Moreover, with such an apparatus in accordance with the invention, it is simply achieved that the apparatus can be set to a reproduction mode corresponding to the stored recordings in dependence upon the detection information generated by means of the detection device.

Another advantageous embodiment of such an apparatus in accordance with the invention is characterized in that in a further reproduction mode of the apparatus, the stationary magnetic head is connected to the input of the detection device, and in that the detection device is adapted to detect the presence of a control signal reproduced from the control signal track on the magnetic tape by means of the stationary magnetic head in said further reproduction mode, for which control signal the length of a recorded signal period is equal to the distance in the longitudinal direction of the tape between two inclined tracks which can be scanned by the same magnetic head, and to generate further detection information upon detection of the presence of such a reproduced control signal. With such an apparatus, it is simple to determine whether recordings of analog video signals and, as the case may be, analog audio signals in accordance with the VHS standard have been stored on a magnetic tape. With such an apparatus in accordance with the invention, it is also simply achieved that the apparatus can be set to a reproduction mode corresponding to the stored recordings in dependence upon the further detection information generated by means of the detection device.

A further advantageous embodiment of such an apparatus in accordance with the invention is characterized in that the detection device is adapted to detect the presence of signal markings in a reproduced control signal and to generate still further detection information upon detection of the presence of such a signal marking. Such an apparatus enables signal markings contained in a control signal in accordance with the invention to be detected in a simple manner, which is particularly important for a so-called trick-play mode, as already stated hereinbefore.

BRIEF DESCRIPTION OF THE DRAWINGS

The invention will be described in more detail on the basis of examples with reference to the diagrammatic drawings, two exemplary embodiments of the invention, to which the invention is not limited, being described.

FIG. 1 shows, diagrammatically, a relevant part of a prior-art video recorder in accordance with the VHS standard, by means of which analog video signals in accordance with a PAL standard and analog audio signals can be recorded and reproduced.

FIG. 2 shows a part of a magnetic tape on which, by means of an apparatus as shown in FIG. 1, analog video signals have been recorded in inclined tracks, analog audio signals in a first longitudinal track, and a control signal in a second longitudinal track.

FIG. 3A shows, diagrammatically, the vertical synchronization pulses of an analog video signals which can be recorded on a magnetic tape as shown in FIG. 2 by means of a video recorder as shown in FIG. 1, and FIG. 3B shows the control signal which has been generated in relation to the vertical synchronization pulses in the video recorder as shown in FIG. 1 and which can be recorded in the second longitudinal track on the magnetic tape shown in FIG. 2.

DESCRIPTION OF THE PREFERRED EMBODIMENTS

Figure 4:
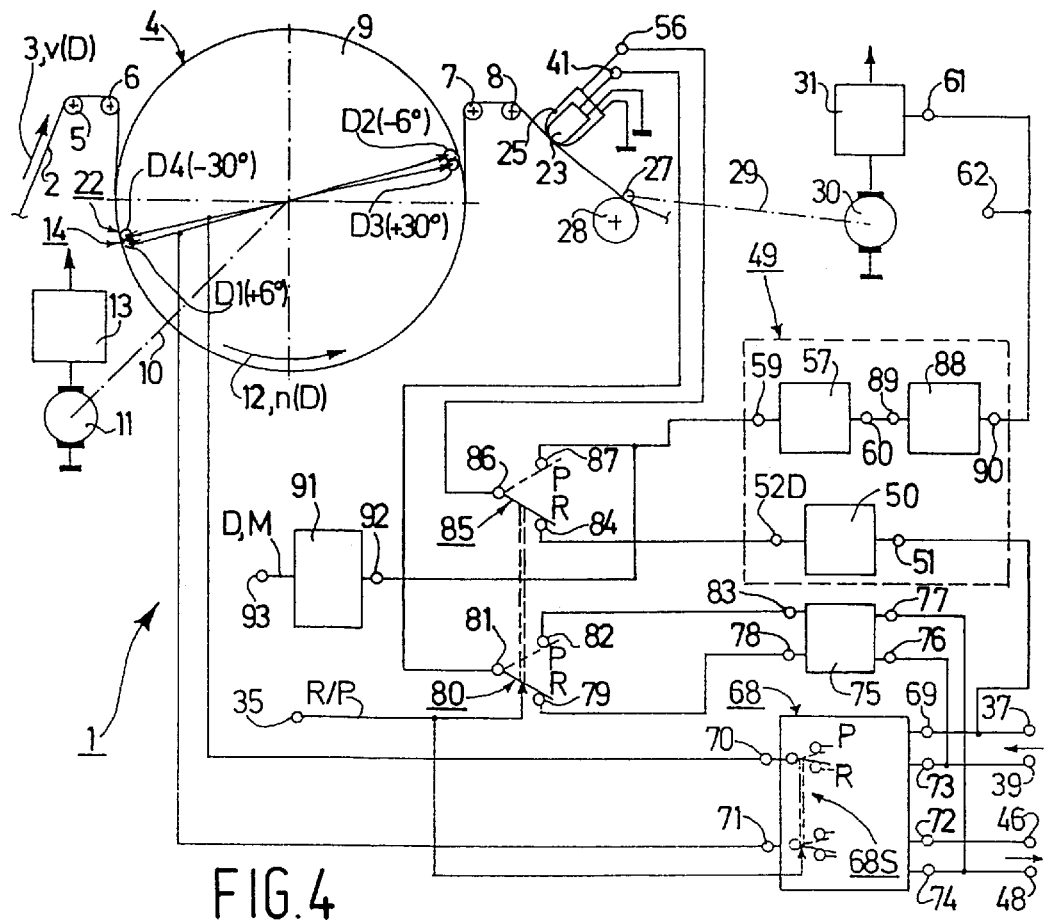
FIG. 4, in the same way as FIG. 1, shows, diagrammatically, a part of a video recorder in accordance with a first embodiment of the invention, configured to record and reproduce digital video signals and digital audio signals.

FIG. 1 shows, diagrammatically, a part of a known prior-art video recorder 1. The video recorder 1 is constructed in accordance with the VHS standard and is configured to record and reproduce analog video signals and analog audio signals on a magnetic tape 2 in adjacent tracks which are inclined relative to the longitudinal or forward direction of the tape indicated by an arrow 3, i.e., in inclined tracks. For this purpose, the video recorder 1 comprises a drum-shaped scanning device 4 around which the magnetic tape 2 is wrapped along a helical path during the recording and reproduction of signals, which is not shown in FIG. 1 but which is generally known to those skilled in the art. Four movable tape guides 5, 6, 7 and 8 serve to wrap the magnetic tape 2 and to keep it wrapped around the drum-shaped scanning device 4.

The drum-shaped scanning device 4 comprises a rotationally drivable head support 9 carrying a plurality of magnetic heads. The rotationally drivable head support 9 can be driven by a motor 11 in a direction indicated by an arrow 12 via a drive transmission 10, which is also shown diagrammatically as a dash-dot line. A power supply arrangement 13 serves to power the motor 11. The power supply arrangement 13 includes a speed control device to drive the motor 11 and hence the head support 9 with a desired given constant speed. In the video recorder 1 shown in FIG. 1, the rotationally drivable head support 9 is driven with a speed n(P)=1500 r.p.m. in all the modes of operation.

For the transmission of analog PAL video signals while the magnetic tape 2 is driven with a normal tape speed v(P)=2.34 cm/s, the head support 9 carries a first head pair 14 of two diagonally mounted magnetic heads SP1 and SP2, whose head gaps have oppositely oriented azimuth angles, by means of which the magnetic tape 2 can be scanned along adjacent inclined tracks 15, 16, 17, 18 and 19, as is illustrated by the zone 20 of inclined tracks shown in FIG. 2. The magnetic head SP1 has an azimuth angle of approximately +6° and the magnetic head SP2 has an azimuth angle of approximately −6°. These azimuth angles of the two magnetic heads SP1 and SP2 are represented by the hatched portions shown in the inclined tracks 15, 17, and 16, 18 which are scanned by these magnetic heads SP1 and SP2.

For the transmission of analog PAL video signals while the magnetic tape 2 is driven with a reduced tape speed v(P/2)=v(P)/2=1.17 cm/s, the head support 9 further carries a second head pair 21 of two diagonally arranged magnetic heads LP1 and LP2 whose head gaps have oppositely oriented second azimuth angles and by means of which the magnetic tape 2 can be scanned along further adjacent inclined tracks, which are not shown in FIG. 2. The head gaps of the magnetic heads LP1 and LP2 occupy angular positions situated close to and, viewed in the direction indicated by an arrow 12, before the head gaps of the magnetic heads SP1 and SP2. The angular spacing between the head gaps of the magnetic heads LP1 and SP2 and the magnetic heads LP2 and SP1, respectively, corresponds substantially to twice the spacing with which two successive line pulses of an analog video signal are or have been recorded in an inclined track, which is a known measure. The magnetic head LP1 has an azimuth angle of approximately +6° and the magnetic head LP2 has an azimuth angle of approximately −6°.

For the transmission of analog audio signals at the two tape speeds v(P) and v(P/2) the head support 9 further carries a further head pair 22 of two diagonally arranged magnetic heads A1 and A2 whose head gaps have oppositely oriented azimuth angles, by means of which the magnetic tape 2 can be scanned along further inclined tracks, not shown in FIG. 2. The head gaps of the magnetic heads A1 and A2 are situated at angular positions which are 40° spaced from and situated behind the head gaps of the magnetic heads SP1 and SP2 in a direction opposite to that indicated by the arrow 12. The magnetic head A1 has a head gap with an azimuth angle of approximately +30° and the magnetic head A2 has a head gap with an azimuth angle of approximately −30°.

It is to be noted that the head support 9 of the drum-shaped scanning device 4 may carry further magnetic heads. These may include, for example, magnetic erase heads for the trackwise erasure of signals stored in inclined tracks.

For the construction of the drum-shaped scanning device 4 and, in particular, the height positions of the magnetic heads SP1, SP2, LP1, LP2, A1 and A2 carried by the head support 9 as well as the gap widths and gap lengths of the head gaps of these magnetic heads reference is made to the afore-mentioned Austrian Patent Applications filed under numbers A 1555/94 and A 1971/94. These Patent Applications give exact specifications relating to said details.

The magnetic tape 2 is further in scanning contact with a stationary magnetic head 23, by means of which analog audio signals can be recorded on and reproduced from the magnetic tape 2 in a first longitudinal track 24 which extends in the longitudinal direction 3 of the tape. The first longitudinal track 24 extends adjacent, i.e., above, the track zone 20 on the magnetic tape 2 shown in FIG. 2.

The magnetic tape 2 is further in scanning contact with a second stationary magnetic head 25 by means of which a control signal of given frequency can be recorded on and reproduced from the magnetic tape 2 in a second longitudinal track 26 which extends in the longitudinal direction 3 of the tape. The second longitudinal track 26, referred to hereinafter as the control signal track 26, also extends adjacent, i.e., below, the track zone 20 on the magnetic tape 2 shown in FIG. 2. The control signal is the CTL signal as defined in the VHS standard. In the present case of the video recorder 1, this CTL signal is associated with the analog video signals in the inclined tracks 15, 16, 17, 18 and 19, for which reason this CTL signal is referred to herein as the A-CTL signal, where the prefixed A refers to "Analog". The length L(A) of a recorded signal period of the A-CTL signal is in a given ratio to the total width of two adjacent inclined tracks 16, 17 or 18, 19 and, as can be seen in FIG. 2, the length L(A) of a recorded signal period of the A-CTL signal is equal to the distance D(A) in the longitudinal direction of the tape between two inclined tracks 15 and 17 which can be scanned by the same magnetic head, for example, the magnetic head SP1.

FIG. 3B shows the A-CTL signal. The signal is generated depending on the vertical synchronization pulses V, shown in FIG. 3A, of an analog video signal to be recorded, in such a manner that each rising edge of the A-CTL signal coincides with the beginning of every second vertical synchronization pulse V. The A-CTL signal is recorded in the control signal track 26 on the magnetic tape 2 in such a manner that a rising edge of the A-CTL signal is each time associated with the end of a given inclined track, namely an inclined track 16 or 18, in which video signals have been recorded by means of the magnetic head SP2 with an azimuth angle of −6°. In FIG. 2, this relationship is represented symbolically by means of the distance X.

It is to be noted that the head gaps of the first stationary magnetic head 23 and of the second stationary magnetic head 25 are customarily disposed in line with one another in a direction transverse to the longitudinal direction 3 of the tape.

The magnetic tape 2 is also in driving engagement with a capstan 27. A movable pressure roller 28 presses the magnetic tape 2 against the capstan 27 during recording and reproduction of signals. The capstan 27 can be driven by a motor 30 via a drive transmission 29, which is shown diagrammatically as a dash-dot line. The motor 30 is powered by a power supply arrangement 31. The power supply arrangement 31 includes a speed control device to drive the motor 30 and hence the capstan 27 with the given constant speeds desired in each case. The capstan 27, which can be driven with a given constant speed, can drive the magnetic tape with a corresponding constant tape speed. In the video recorder 1 shown in FIG. 1, the magnetic tape 2 can be driven to record and reproduce analog PAL video signals and analog audio signals with a tape speed v(P)=2.34 cm/s in a so-called Short-Play mode and with a tape speed v(P/2)=v (P)/2=1.17 cm/s in a Long-Play mode.

The video recorder 1 shown in FIG. 1 has a signal processing device 32 for processing analog PAL video signals and analog audio signals. This signal processing device 32 inter alia includes a modulator device and a demodulator device for modulating and demodulating the luminance signal components of the analog PAL video signals and frequency conversion devices for the frequency conversion of the chrominance signal components of the analog PAL video signals, as well as frequency-response-modifying circuit elements, amplifiers and an audio signal processing device for processing the analog audio signals which can be recorded and reproduced by means of the stationary magnetic head 23 but also for the frequency-modulation and frequency-demodulation of analog audio signals to enable frequency-modulated analog audio signals to be recorded by means of the rotationally drivable magnetic heads A1 and A2 and to enable frequency-modulated analog audio signals reproduced by means of the magnetic heads A1 and A2 to be frequency-demodulated, respectively. The signal processing device 32 further comprises change-over switches 34 by means of which it is possible to change over between a recording mode R (R=Record) and a reproducing mode P (P=Playback). This change-over is effected in response to control information RIP available at a terminal 35 in the video recorder 1 and which can be applied from this terminal 35 to the switches 34 in the signal processing device 32.

The signal processing device 32 has a first input 36, at which the signal processing device 32 can receive an analog PAL video signal appearing at a terminal 37 of the video recorder 1. The signal processing device 32 further has a second input 38 at which the signal processing device 32 can receive an analog audio signal appearing at a terminal 39 of the video recorder 1.

The signal processing device 32 further has a first terminal 40. Analog audio signals processed by the signal processing device 32 can be applied to the first stationary magnetic head 23 in order to be recorded, via the terminal 41 of this head, in the first longitudinal track 24 on the magnetic tape 2, and analog audio signals reproduced by means of the first stationary magnetic head 23 can be applied to the signal processing device 32 in order to be processed via the first terminal 40. The signal processing device 32 further has a second terminal 42. Analog PAL video signals processed by the signal processing device 32 can be applied to the two magnetic heads SP1 and SP2 in the Short-Play mode in order to be recorded, and analog PAL video signals reproduced by the two magnetic heads SP1 and SP2 in the Short-Play mode can be applied to the signal processing device 32 in order to be processed, via the second terminal 42. The signal processing device 32 further has a third terminal 43. Analog PAL video signals processed by the signal processing device 32 in the Long-Play mode can be applied to the magnetic heads LP1 and LP2 in order to be recorded on the magnetic tape 2, and analog PAL video signals reproduced by the two magnetic heads LP1 and LP2 in the Long-Play mode can be applied to the signal processing device 32 in order to be processed, via the third terminal 43. The signal processing device 32 further has a fourth terminal 44. Frequency-modulated analog audio signals processed by the signal processing device 32 can be applied to the two magnetic heads A1 and A2 in order to be recorded on the magnetic tape 2 in inclined tracks, and frequency-modulated analog audio signals reproduced by the two magnetic heads A1 and A2 can be applied to the signal processing device 32 in order to be frequency-demodulated by the frequency demodulator 33, via the fourth terminal 44. It is to be noted that a rotary transformer is arranged between the terminals 40, 42, 43 and 44 and the magnetic heads SP1, SP2 and LP1, LP2, and A1, A2, but this is not shown separately in FIG. 1.

The signal processing device 32 further has a first output 45 at which the reproduced analog PAL video signals processed by the signal processing device 32 are available, which signals can be applied to a terminal 46 of the video recorder 1 for further processing. The signal processing device 32 further has a second output 47 at which the reproduced analog audio signals processed by the signal processing device 32 are available, which signals can be applied to a further terminal 48 of the video recorder 1.

The video recorder 1 shown in FIG. 1 comprises a control signal arrangement 49. This control signal arrangement 49 includes a control signal generation device 50 whose input 51 is connected to the terminal 37 of the video recorder 1, at which terminal the analog PAL video signals to be recorded are available. The analog video signals to be recorded are applied to the control signal generation device 50 via the input 51. The control signal generation device 50 comprises a vertical synchronization signal separator which supplies a signal which is shown diagrammatically in FIG. 3A and which contains mainly the separated vertical synchronization pulses V. The control signal generation device 50 further comprises a squarewave generator which is triggered by the extracted vertical synchronization pulses and which, depending on the vertical synchronization pulses V, generates the control signal, i.e., the A-CTL signal, which is shown in FIG. 3B and which has a given frequency dictated by the frequency of the vertical synchronization pulses V. The A-CTL signal generated in the control signal generation device 50 appears at an output 52A of the control signal generation device 50 and is applied to a first contact 53 of a change-over switch 54. The switch 54 can be switched between a recording position R, shown as a solid line in FIG. 1, and a reproducing position P, shown as a broken line in FIG. 1, in dependence upon the control information R/P appearing at the terminal 35 of the video recorder 1. From the change-over contact 55 of the switch 54, the A-CTL signal generated by means of the control signal generation device 50 can be applied to a terminal 56 of the second stationary magnetic head 25. By means of the second stationary magnetic head 25, the A-CTL signal can be recorded in the control signal track 26 on the magnetic tape 2, the A-CTL signal thus being stored on the magnetic tape 2 in a manner as shown in FIG. 2.

The control signal arrangement 49 further comprises a control signal processing device 57. An A-CTL signal scanned from the control signal track 26 by means of the second stationary magnetic head 25 can be applied to the second contact 58 of the change-over switch 54 via the terminal 56 of the second magnetic head 25 and the change-over contact 55 when the switch 54 is in its reproducing position P, and from the second contact 58 it can be applied to an input 59 of the control signal processing device 57. In the control signal processing device 57, the A-CTL signal scanned from the magnetic tape 2 is regenerated, after which the reproduced A-CTL signal appears in amplified form on an output 60 of the control signal processing device 57. From the output 60 of the control signal processing device 57, the reproduced A-CTL signal can be applied to an input 61 of the power supply arrangement 31. From the input 61, the A-CTL signal is applied to the speed control device included in the power supply arrangement 31, in which device the A-CTL signal is processed to provide frequency and phase information. In the speed control device, the frequency of the A-CTL signal is compared with a nominal value defined for a customary reproducing mode. This comparison results in the magnetic tape 2 being driven with a customary reproduction tape speed. As a result, the magnetic tape 2 is driven with the tape speed v(P) in a Short-Play mode in such a manner that the magnetic heads SP1 and SP2 exactly scan the inclined tracks 15, 16 and 17 recorded on the magnetic tape 2. It is to be noted that the A-CTL signal is also applied to a terminal 62 of the video recorder 1, where the A-CTL signal is available for further use in the video recorder 1. Such a further use of the A-CTL signal is that by means of the reproduced A-CTL signal, it is possible to recognize and detect which magnetic head or which magnetic heads enter into or are in scanning contact with the magnetic tape 2.

In a manner not shown, the video recorder 1 shown in FIG. 1 can be set to different modes of operation. These include, for example, a Short-Play recording mode R(A), a Short-Play reproducing mode P(A), a Long-Play recording mode, a Long-Play reproducing mode, and so-called Feature modes and Rewind modes. When the video recorder 1 is in the Short-Play recording mode R(A), a magnetic tape 2, as shown in FIG. 2, is obtained by means of the video recorder 1 shown in FIG. 1, on which tape analog video signals recorded by means of the magnetic heads SP1 and SP2 and, if applicable, analog frequencymodulated audio signals recorded by means of the magnetic heads A1 and A2 have been stored in the inclined tracks 15, 16, 17, 18 and 19 and on which analog audio signals recorded by means of the first stationary magnetic head 23 have been stored in the first longitudinal track 24, and on which the A-CTL signal recorded by means of the second stationary magnetic head 25 has been stored as a control signal in the control signal track 26.

FIG. 4, in a similar way to FIG. 1, shows, diagrammatically, a part of a video recorder 1 in accordance with a first embodiment of the invention. The video recorder 1 also comprises a drum-shaped scanning device 4 with a rotationally drivable head support 9. The head support 9 also carries two pairs 14 and 22 of magnetic heads D1, D2, and D3, D4. In the video recorder 1 shown in FIG. 4, the magnetic heads D1 and D2 of the one head pair 14 and the magnetic heads D3 and D4 of the further head pair 22 are arranged on the head support 9 in such a relationship to one another that the magnetic heads D1 and D2 of the one head pair 14 and the magnetic heads D3 and D4 of the further head pair 22 scan adjacent interleaved inclined tracks 63, 64, 65, 66, as shown in the track zone 67 on the magnetic tape 2 in FIG. 5, when the magnetic tape 2 is driven with a given tape speed v(D) in the forward direction 3 and the head support is driven with a given speed n(D) in the direction indicated by the arrow 12. One of the inclined tracks scanned by a magnetic head D1 or D2 of a head pair 14 of the two head pairs 14 and 22 is then each time situated between two of the inclined tracks scanned by the magnetic heads D3 and D4 of the other head pair 22 of these two head pairs 14 and 22, as can be seen in the track zone 67 shown in FIG. 5. In the inclined tracks 63, 64, 65 and 66 the azimuth angles of the magnetic heads D3, D1, D4 and D2 are each indicated by a hatched area. For the construction of the head support 9 and, in particular, the arrangement of the magnetic heads D1, D2, D3 and D4 carried by the head support 9 reference is made to the afore-mentioned Austrian Patent Application A 1971/94, which describes these features in detail.

The video recorder 1 shown in FIG. 4 is adapted to record and reproduce digital video signals and digital audio signals in the inclined tracks 63, 64, 65, 66 of the track zone 67. The digital video signals and digital audio signals are recorded in an interleaved manner. In the video recorder 1 shown in FIG. 4, digital video signals and digital audio signals are recorded with said tape speed v(D), the head support 9 with the magnetic heads D1, D2, D3, D4 mounted on it being driven with a speed of rotation n(D). In the video recorder 1 shown in FIG. 4, the given tape speed v(D) has, for example, a value v(D)=v(N)=3.33 cm/s. This speed v(N) corresponds to the normal tape speed in a Short-Play mode of a video recorder in accordance with the VHS standard for recording and reproducing analog video signals in conformity with the NTSC standard. However, said given tape speed v(D) in the video recorder 1 as shown in FIG. 4 may also have a value which differs from v(N).

In the video recorder 1 shown in FIG. 4, the given speed of rotation n(D) has a value n(D)=n(N)=1800 r.p.m. This speed n(N) corresponds to the normal head speed of a video recorder in accordance with the VHS standard for recording and reproducing analog video signals in conformity with the NTSC standard. However, this speed n(D) may also have a value which differs from n(N).

In the video recorder 1 shown in FIG. 4, the magnetic head D1 has an azimuth angle of +6°, the magnetic head D2 has an azimuth angle of −6°, the magnetic head D3 has an azimuth angle of +30°, and the magnetic head D4 has an azimuth angle of −30°. During the recording of digital video signals and digital audio signals by means of the four magnetic heads D1, D2, D3 and D4, successive inclined tracks are scanned, every four inclined tracks forming a track group, of which the first inclined track is scanned with the magnetic head D3 having an azimuth angle of +30°, the second inclined track is scanned with the magnetic head D1 having an azimuth angle of +6°, the third inclined track is scanned with the magnetic head D4 having an azimuth angle of −30°, and the fourth inclined track is scanned with the magnetic head D2 having an azimuth angle of −6°.

Figure 6A:
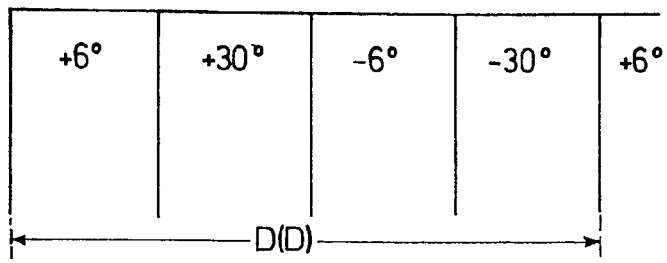
FIG. 6A shows, diagrammatically, four adjacent inclined tracks on a magnetic tape as shown in FIG. 5.

However, in a video recorder as shown in FIG. 4, it is also possible that of the recorded track groups of four inclined tracks each, the first inclined track is scanned with the magnetic head D1 having an azimuth angle of +6°, the second inclined track is scanned with the magnetic head D3 having an azimuth angle of +30°, the third inclined track is scanned with the magnetic head D2 having an azimuth angle of −6°, and the fourth inclined track is scanned with the magnetic head D4 having an azimuth angle of −30°, as is shown in FIG. 6A.

The video recorder 1 shown in FIG. 4 has a signal processing device 68 for processing digital video signals and digital audio signals. The signal processing device comprises change-over switches 68S by means of which it is possible to change over between a recording mode R(D) and a reproduction mode P(D). The signal processing device 68 has a first input 69. At its first input 69, the signal processing device 68 can receive the analog video signals available at the terminal 37. From the first input 69, the analog video signals are applied to the signal processing device 68. In the signal processing device 68, these analog video signals are digitized and processed to be recorded in digital form. Subsequently, the video signals, which have been processed by the signal processing device 68 in order to be recorded in digital form, are applied to a first terminal 70 and a second terminal 71. From the first terminal 70 and the second terminal 71, the digital video signal to be recorded can be applied to the magnetic heads D3, D1, D4, D2, which four magnetic heads D3, D1, D4, D2 record the digital video signals applied to them in the adjacent inclined tracks 63, 64, 65, 66 on the magnetic tape 2, the magnetic tape 2 being driven in the forward tape-transport direction 3 with the tape speed v(D)=v(N).

Digital video signals reproduced from the inclined tracks 63, 64, 65, 66 by means of the magnetic heads D3, D1, D4, D2 are applied to the two terminals 70 and 71 of the signal processing device 68. In the signal processing device 68, the reproduced digital video signals applied to this device are processed and subsequently converted into analog video signals. The converted analog video signals are applied to a first output 72 of the signal processing device 68, from which they are transferred to the terminal 46 of the video recorder 1 in FIG. 4 for further processing.

The signal processing device 68 further comprises a second input 73, to which the analog audio signals available at the terminal 39 can be applied. From the second input 73, the applied analog audio signals are fed to the signal processing device 68, and in the signal processing device 68, these analog audio signals are subsequently converted into digital audio signals and processed to be recorded on the magnetic tape 2 in digital form. The audio signals, which have been processed in order to be recorded on the magnetic tape 2, are also transferred to the two terminals 70 and 71 of the signal processing device 68, in the same way as the digital video signals which have been processed for recording, the digital audio signals processed for recording and the digital video signals processed for recording being interleaved. The processed digital audio signals as well as the processed digital video signals are recorded in the inclined tracks 63, 64, 65 and 66 on the magnetic tape 2 by means of the magnetic heads D3, D1, D4, D2.

Digital audio signals reproduced from the magnetic tape 2, together with the digital video signals interleaved with them, are applied to the terminals 70 and 71 of the signal processing device 68. In the signal processing device 68, the digital audio signals are separated from the digital video signals and are subsequently converted into analog audio signals. The analog audio signals are applied to a second output 74 of the signal processing device 68, from which they are transferred to the terminal 48 of the video recorder 1 in FIG. 4 for further processing.

The video recorder 1 shown in FIG. 4 further comprises a further signal processing device 75 for processing analog audio signals. An input 76 of the further signal processing device 75 is connected to the terminal 39 of the video recorder 1 in FIG. 4, and an output 77 of the further signal processing device 75 is connected to the terminal 48 of the video recorder 1 in FIG. 4. After processing in the further signal processing device 75, the analog audio signals applied to the input 76 of this signal processing device 75 are transferred to a further output 78 of this device. The further output 78 is connected to a first contact 79 of a change-over switch 80, whose change-over contact 81 is connected to the terminal 41 of the first stationary magnetic head 23. The switch 80 can be switched between a recording position R, shown as a solid line in FIG. 4, and a reproducing position P, shown as a broken line in FIG. 4. Changing over of the switch 80 can be effected in dependence upon the control information R/P at the terminal 35. Analog audio signals applied to the first stationary magnetic head 23 from the further signal processing device 75 via the change-over switch 80 are recorded in the first longitudinal track 24 of the magnetic tape 2 by means of the first stationary magnetic head 23. Analog audio signals reproduced from the first longitudinal track 24 on the magnetic tape 2 by means of the first stationary magnetic head 23 are applied from the terminal 41 of the first stationary magnetic head 23 to the change-over contact 81 of the change-over switch 80, and when the switch 80 is in its reproduction position P, they are applied to a second contact 82 of the change-over switch 80, from which the reproduced analog audio signals are transferred to a further input 83 of the further signal processing device 75. The reproduced analog audio signals thus applied are processed in the further signal processing device 75, after which they appear on the output 77 of this further signal processing device 75, from which output they are applied to the terminal 48 of the video recorder 1 shown in FIG. 4, where they are available for further processing.

The video recorder 1 in FIG. 4 also comprises a control signal arrangement 49. The control signal arrangement 49 also comprises a control signal generation device 50 whose input 51 is connected to the terminal 37. However, the control signal generation device 50 of the video recorder 1 shown in FIG. 4 differs from the control signal generation device 50 of the video recorder 1 shown in FIG. 1.

The control signal generation device 50 in the video recorder 1 shown in FIG. 4 is adapted to generate a new control signal, referred to hereinafter as D-CTL signal, the length L(D) of a recorded signal period of this signal being equal to the value, divided by N, of the distance D(D) in the longitudinal direction of the tape between two inclined tracks which can be scanned by the same magnetic head, N being an integer greater than 1. In the present case of the video recorder 1 shown in FIG. 4, N has been selected to equal 3, so that the D-CTL signal has a frequency equal to substantially three times that of a customary known CTL signal. The control signal generation device 50 has an output 52D, on which the control signal generation device 50 produces the D-CTL signal. The output 52D is connected to a first contact 84 of a second change-over switch 85, whose change-over contact 86 is connected to the terminal 56 of the second stationary magnetic head 25. In the recording mode R(D) of the video recorder 1 shown in FIG. 4, the output 52D of the control signal generation device 50 is thus connected to the second stationary magnetic head 25 via the second change-over switch 85 to record the new control signal, i.e., the D-CTL signal, in the control signal track 26 on the magnetic tape 2.

Figure 5:
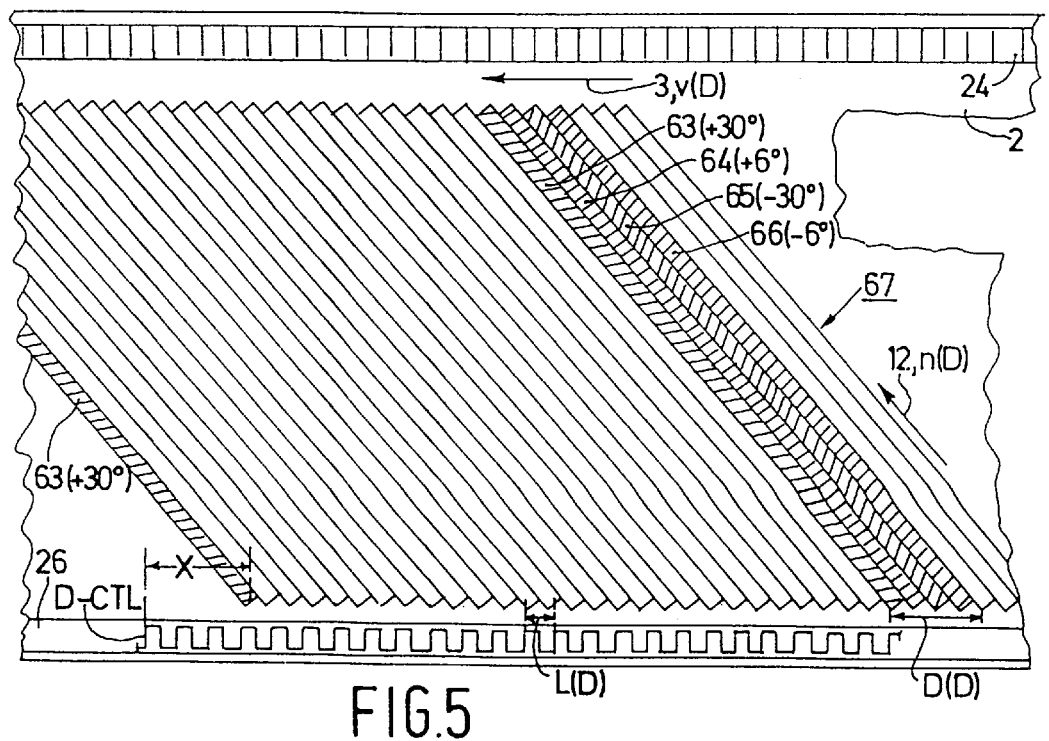
FIG. 5 shows a part of a magnetic tape on which, by means of a video recorder as shown in FIG. 4, digital video signals and digital audio signals have been recorded and on which analog audio signals have been recorded in a first longitudinal track and a control signal in a second longitudinal track.
Figure 6B:
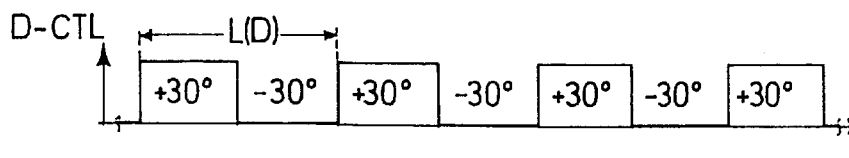
FIG. 6B shows the control signal stored on the magnetic tape of FIG. 5 in relation to the inclined tracks shown in FIG. 6A.

FIG. 5 diagrammatically shows both the analog audio signal recorded in the first longitudinal track 24 and the D-CTL signal recorded in the control signal track 26. The D-CTL signal is a squarewave signal, the frequency of the D-CTL signal being equal to approximately three times the frequency of a customary known CTL signal, as already stated above. The length L(D) of a recorded signal period of D-CTL signal is in a given ratio to a fraction of the overall width of four adjacent inclined tracks 63, 64, 65 and 66, namely, one third of the overall width of four adjacent inclined tracks 63, 64, 65 and 66, and the length L(D) of a recorded D-CTL signal is equal to the value, divided by N=3, of the distance D(D) in the longitudinal direction of the tape between two inclined tracks 63 which can be scanned by the same magnetic head, for example, the magnetic head D3, as can be seen in FIG. 5 and FIGS. 6A and 6B. It is to be noted that the control signal is recorded on the magnetic tape 2 in such a manner that a given rising edge of the D-CTL signal is situated at a given distance X from the beginning of a given inclined track, in which the digital video signals and digital audio signals have been recorded, and is associated with this given inclined track. The given rising edge of the D-CTL signal may be situated at a given distance X from the beginning of an inclined track in which the digital video signals and digital audio signals have been recorded by means of the magnetic head D3 with an azimuth angle of +30°, as illustrated in FIG. 5. However, alternatively, it may be situated at a distance X from the beginning of an inclined track in which the signals have been recorded by the magnetic head D1 with an azimuth angle of +6°, or by the magnetic head D4 with an azimuth angle of −30°, or by the magnetic head D2 with an azimuth angle of −6°.

In the reproduction mode P(D) of the video recorder 1 shown in FIG. 4, the new control signal, i.e., the D-CTL signal, recorded in the control signal track 26 is scanned by the second stationary magnetic head 25 and, via the terminal 56, it is applied to the change-over contact 86 of the second change-over switch 85. From the change-over contact 86, the D-CTL signal is applied to a second contact 87 of the second change-over switch 85. From the second contact 87 of the second change-over switch 85, the reproduced D-CTL signal is applied to the input 59 of the control signal processing device 57, in which the reproduced D-CTL signal is regenerated and further processed. The reproduced D-CTL signal thus processed appears on the output 60 of the control signal processing device 57.

The control signal arrangement 49 in the video recorder 1 shown in FIG. 4 includes a frequency divider 88 having its input 89 connected to the output 60 of the control signal processing device 57 and having its output 90 connected to the input 61 of the power supply arrangement 31, which includes the speed control device for the motor 10 for driving the capstan 27. In this way, it is achieved that in the reproduction mode P(D) of the video recorder 1 in FIG. 4—in which the second stationary magnetic head 25 is connected to the input 59 of the control signal processing device 57 to receive a control signal reproduced from the control signal track 26, i.e., the D-CTL signal—the frequency divider 88 is connected after the output 60 of the control signal processing device 57, which output serves to supply a processed control signal, i.e., D-CTL signal. The frequency divider 88 divides the frequency of the reproduced D-CTL signal. In the present case of the video recorder 1 shown in FIG. 4, the frequency of the reproduced D-CTL signal is divided by the factor N=3. This is because in the video recorder 1 in FIG. 1, the length L(D) of a recorded signal period of the D-CTL signal is equal to the value of the distance D(D) in the longitudinal direction of the tape between two inclined tracks 63 which can be scanned by the same magnetic head, divided by N=3. This frequency division results in a frequency-divided reproduced D-CTL signal at the output 90 of the frequency divider 88, which signal has a frequency which substantially corresponds to the frequency of a customary known A-CTL signal. The frequency-divided reproduced D-CTL signal at the output 90 of the frequency divider 88 is applied to the input 61 of the power supply arrangement 31 and thence to the speed control device in the power supply arrangement 31, in which speed control device, it is compared with a nominal value corresponding to a customary reproduction tape speed. In response to this comparison between the frequency-divided reproduced D-CTL signal and this nominal value, the speed of the motor 30 and the capstan 27 is controlled to such a value that the magnetic tape 2 is driven with a reproduction tape speed v(D)=v(N)=3.33 cm/s required for a correct reproduction of the digital video signals and digital audio signals recorded in the inclined tracks 63, 64, 65 and 66.

The video recorder 1 shown in FIG. 4 comprises a detection device 91 having an input 92 and an output 93. The input 92 is connected to the second contact 87 of the second change-over switch 85. In this way, it is achieved that the second stationary magnetic head 25 is connected to the input 92 of the detection device 91 in the reproduction mode P(D) of the video recorder 1 in FIG. 4. The detection device 91 is adapted to detect the presence of the control signal, i.e., the D-CTL signal, reproduced from the control signal track 26 on the magnetic tape 2 by means of the second stationary magnetic head 25 in the reproduction mode P(D) of the video recorder 1 shown in FIG. 4. Moreover, the detection device 91 is configured in such a manner that upon detection of the presence of the reproduced D-CTL signal, it generates detection information which is available at its output 93. The detection information D indicates that a D-CTL signal has been recorded in the control signal track 26 on the magnetic tape 2, which is the case only if digital video signals and digital audio signals have been recorded in the inclined tracks on the magnetic tape 2. Thus, the detection information D indicates that the magnetic tape 2 being scanned is a magnetic tape with digital video signals and digital audio signals stored in inclined tracks. In the video recorder 1 shown in FIG. 4, the detection information D is used for several purposes. The detection information D may, for example, produce an indication which confirms to a user that a cassette with a magnetic tape 2 containing digital video signals and digital audio signals has been loaded into the video recorder 1 shown in FIG. 4.

When a magnetic tape 2 as shown in FIG. 5, i.e., on which digital video signals and digital audio signals have been stored in inclined tracks 63, 64, 65, 66, an analog audio signal in the first longitudinal track, and a D-CTL signal in the control signal track 26, is loaded into a known video recorder in accordance with the VHS standard as shown in FIG. 1, the analog audio signal is reproduced from the first longitudinal track 24 by the first stationary magnetic head 23 and is applied to the signal processing device 32 via the first terminal 40 in order to be processed therein as an analog audio signal. Furthermore, the D-CTL signal is reproduced from the control signal track 26 by means of the second stationary magnetic head 25 and is applied to the change-over switch 54 via the terminal 56 of the second magnetic head 25 and then to the control signal processing device 57. From the control signal processing device 57, the reproduced and processed D-CTL signal is applied to the speed control device in the power supply arrangement 31. In the speed control device, the frequency of the D-CTL signal is compared with a nominal value specified for a customary reproduction mode. As a result of this comparison, since the frequency of the D-CTL signal has been tripled in comparison with that of a customary known CTL signal, the magnetic tape 2 is driven with a tape speed reduced to one third of a customary reproduction tape speed. The consequences of this will be described with reference to FIGS. 6A–6D.

Figure 6C:
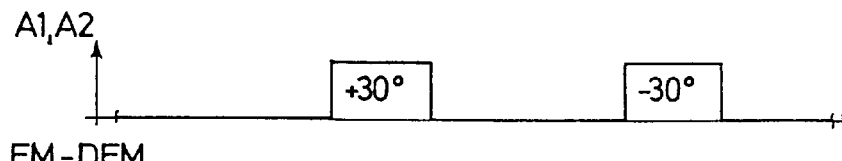
FIG. 6C shows the digital signals scanned from the inclined tracks of the magnetic tape of FIG. 5 by means of a pair of rotationally drivable magnetic heads with azimuth angles of +30° and −30° while the magnetic tape of FIG. 5 is driven with a tape speed influenced by means of the control signal shown in FIG. 6B.
Figure 6D:
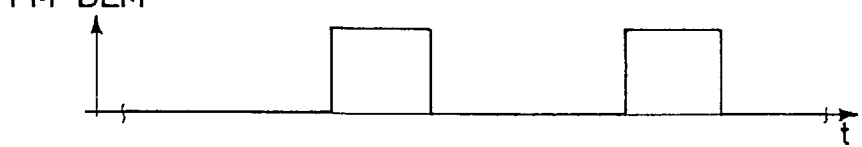
FIG. 6D shows a signal appearing in an FM demodulator as a result of the signals shown in part FIG. 6C.

FIG. 6A diagrammatically shows four successive inclined tracks in which digital video signals and digital audio signals have been recorded with magnetic heads whose azimuth angles successively have the following values: +6°, +30°, −6°, −30°. FIG. 6B shows the D-CTL signal in relation to the inclined tracks shown in FIG. 6A. FIG. 6C shows when an output signals is supplied by the magnetic heads A1 and A2 of the video recorder 1 in FIG. 1, whose azimuth angles are +30° and −30°, during scanning of the inclined tracks shown in FIG. 6A by these magnetic heads A1 and A2, the signals being digital video signals and digital audio signals reproduced by means of the magnetic heads A1 and A2 which, in the video recorder 1 of FIG. 1, have in fact been provided to record and reproduce frequency-modulated analog audio signals. In the video recorder 1 shown in FIG. 1, the digital video signals and digital audio signals reproduced fragmentarily from the inclined tracks on a magnetic tape 2 as shown in FIG. 5 by means of the magnetic heads A1 and A2 in the video recorder 1 of FIG. 1 are applied to the fourth terminal 44 of the signal processing device 32 and are transferred to the frequency demodulator 33 in this signal processing device 32, as a result of which cyclically succeeding comparatively long signal breaks occur in the useful signal from the frequency demodulator 33, which signal is shown in FIG. 6D. Such signal breaks are detected in a customary manner in a frequency demodulator, to disable the frequency demodulator so as to avoid an annoying audio signal reproduction. This precludes an annoying acoustic reproduction of the fragmentarily reproduced digital video signals and digital audio signals in a video recorder 1 as shown in FIG. 1 because the magnetic tape 2 recorded by means of a video recorder 1 as shown in FIG. 4 and loaded into a video recorder 1 as shown in FIG. 1 is driven with such a low tape speed that processing of the digital video signals and digital audio signals reproduced fragmentarily by means of the magnetic heads A1 and A2 which have in fact been provided for reproducing frequency-modulated analog audio signals is inhibited.

Figure 7:
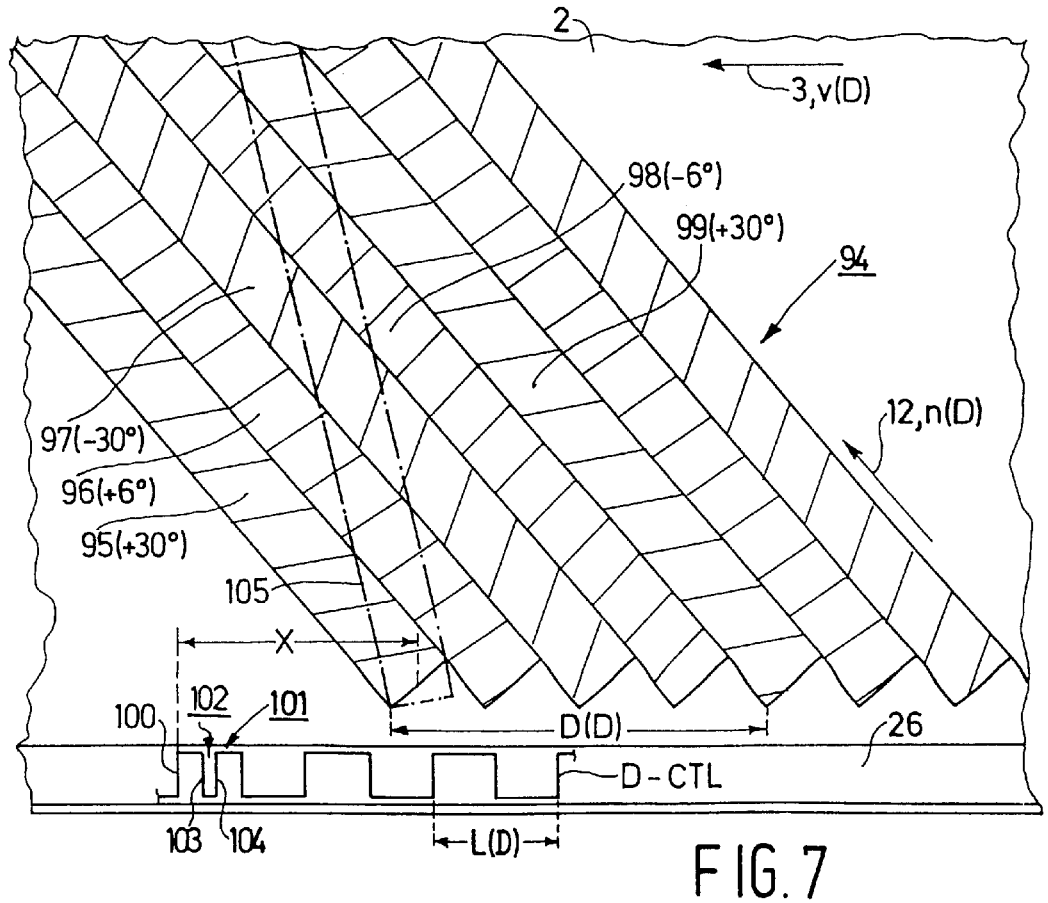
FIG. 7 shows a magnetic tape, in the same way as FIG. 5 but only partly and to an enlarged scale, on which digital video signals and digital audio signals have been recorded in inclined tracks and on which a control signal with signal markings has been recorded in a second longitudinal track.

FIG. 7 shows a part of a magnetic tape 2 in the same way as FIG. 5 but smaller and therefore to a larger scale, which tape has been provided with adjacent inclined tracks 95, 96, 97, 98 and 99 which are inclined relative to the longitudinal direction 3 of the tape in a track zone 94, which tracks have been recorded on the magnetic tape 2 with a tape speed v(D). The inclined tracks 95, 96, 97, 98 and 99 have been recorded, for example, by means of a video recorder 1 as shown in FIG. 4, in which digital video signals and digital audio signals have been recorded in the inclined track 95 by means of the magnetic head D3 with an azimuth angle of +30°, in the inclined track 9 by means of the magnetic head D1 with an azimuth angle of +6°, in the inclined track 97 by means of the magnetic head D4 with an azimuth angle of −30°, and in the inclined track 99 again by means of the magnetic head D3 with an azimuth angle of +30°.

A D-CTL signal has been recorded in the control signal track 26 on the magnetic tape 2 in FIG. 7, in the same way as on the magnetic tape 2 in FIG. 5, which recording has been made, for example, by means of the second stationary magnetic head 25 of a video recorder 1 as shown in FIG. 4. For the D-CTL signal in the control signal track 26 of the magnetic tape 2 in FIG. 7, the length L(D) of a recorded signal period of this D-CTL signal is equal to the value of the distance D(D) in the longitudinal direction 3 of the tape between two inclined tracks 95 and 99, which can be scanned by the same magnetic head, for example, the magnetic head D3, divided by N=3. The generation of the D-CTL signal recorded on the magnetic tape 2 of FIG. 7 has been effected by the control signal generation device 50 of the video recorder 1 shown in FIG. 4.

However, the control signal, i.e., the D-CTL signal, stored in the control signal track 26 of the magnetic tape 2 as shown in FIG. 7 is a special control signal since in this D-CTL signal, a given signal edge, i.e., the rising signal edge 100, associated with a given inclined track, in the present case, the inclined track 95, has been marked by a signal marking 101 provided in the signal period following the given signal edge 100. In the present D-CTL signal, the signal marking 101 is obtained in that a pulse gap 102 has been provided in the signal pulse in the signal period following the given signal edge 100, which gap is bounded by a falling edge 103 and a subsequent rising edge 104. In the present case, said signal marking 101 is formed by the rising signal edge 104. Such a signal marking 101 recurs periodically in such a D-CTL signal, for example, every fourth or every eighth or every twenty-fourth of the rising signal edges, which are each associated with a given inclined track, in order to mark the associated inclined track.

Such a signal marking 101 is of particular importance for a so-called trick-play mode. In a trick-play mode, the magnetic tape 2 is scanned along trick-play scanning tracks, of which a trick-play scanning track 105 is shown in dash-dot lines in FIG. 7 by way of illustration. As is shown, the track-play scanning track 105 intersects several of the recorded inclined tracks 95, 96, 97, 98 and 99. In the case of video recorders for digital video signals and digital audio signals recorded in inclined tracks, these trick-play scanning tracks 105 have accurately defined relative positions with respect to the normal inclined tracks 95, 96, 97, 98 and 99. This can be achieved, for example, in that the beginning of such a trick-play scanning track 105 coincides with the beginning of a given inclined track, for example, the inclined track 95. In the case of trick-play reproduction, scanning of the trick-play scanning track 105 by means of the rotationally drivable magnetic heads should then be started exactly at the beginning of this trick-play scanning track 105, i.e., in the present case, at the beginning of the given inclined track 95. In a video recorder for recording and reproducing digital video signals and digital audio signals in inclined tracks, this can be achieved in a comparatively simple manner in that the beginning of the inclined track 95 is located with the aid of the signal marking 101, which marks the rising signal edge 100 associated with the inclined track 95. Thus, the beginning of the inclined track 95 can be determined simply by detecting the signal marking 101.

In this respect it is to be noted that the detection device 91 of the video recorder 1 as shown in FIG. 4 is adapted to detect signal markings 101 in a reproduced control signal, i.e., the D-CTL signal, and that upon detection of the presence of such a signal marking 101, the detection device 91 produces further detection information M at the output 93 of the device. The detection information M can then be used in the video recorder 1 of FIG. 4 to bring the rotationally drivable magnetic heads for scanning a trick-play scanning track in a trick-play mode into a position relative to the magnetic tape 2 in which they exactly follow this trick-play scanning track 105, which is possible, for example, by influencing the trick-play tape speed.

Figure 8:
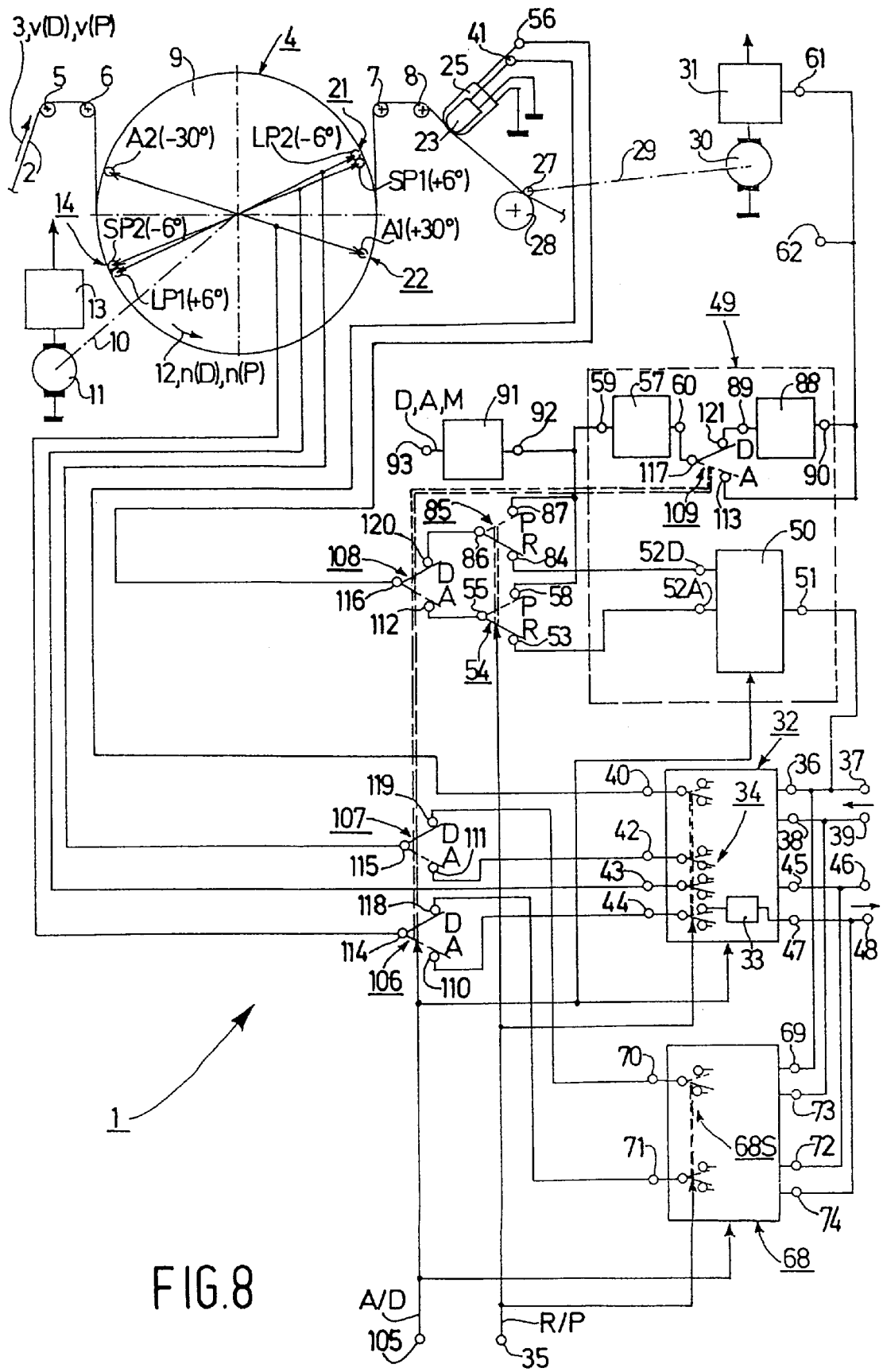
FIG. 8, in the same way as FIGS. 1 and 4, shows, diagrammatically, a part of a video recorder in accordance with a second embodiment of the invention, configured to record and reproduce digital video signals and digital audio signals and to record and reproduce analog video signals and analog audio signals.

FIG. 8, in the same way as FIG. 4, shows, diagrammatically, a part of a video recorder 1 in accordance with a second embodiment of the invention. The video recorder 1 shown in FIG. 8 is adapted both to record and reproduce analog PAL video signals and associated analog audio signals in an analog mode A and to record and to record and reproduce digital video signals and associated digital audio signals in a digital mode D. However, alternatively, the video recorder 1 as shown in FIG. 8 may be adapted to record and reproduce analog NTSC video signals and associated analog audio signals.

The video recorder 1 in FIG. 8 has a drum-shaped scanning device 4 with a rotationally drivable head support 9. The head support 9, in the same way as in the video recorder 1 of FIG. 1, carries three pairs 14, 21 and 22 of magnetic heads SP1, SP2 and LP1, LP2 and A1, A2. However, in the video recorder 1 shown in FIG. 8, as compared with the video recorder 1 of FIG. 1, the magnetic heads LP1 and LP2 of the second head pair 21 occupy another relative position with respect to the magnetic heads SP1 and SP2 of the first head pair 14, with respect to the magnetic heads A1 and A2 of the further head pair 22 and with respect to the head support 9, i.e., the magnetic heads LP1 and LP2 of the second head pair 21 in the video recorder 1 of FIG. 8 are disposed at a higher level than in the video recorder 1 of FIG. 1. For the arrangement of the magnetic heads SP1, SP2, LP1, LP2, A1 and A2 on the head support 9 of the video recorder 1 of FIG. 8, reference is made to the afore-mentioned Austrian Patent Applications A 1555/94 and A 1971/94, which describe these features in detail. In the video recorder 1 of FIG. 8, the magnetic heads LP1 and LP2 of the second head pair 21 and the magnetic heads A1 and A2 of the further head pair 22 are arranged on the head support in such a relationship to one another that the magnetic heads LP1 and LP2 of the second head pair 21 and the magnetic heads A1 and A2 of the further head pair 22 scan adjacent interleaved inclined tracks corresponding to the inclined tracks 63, 64, 65, 66, as shown in the track zone 67 on the magnetic tape 2 in FIG. 5, and to the inclined tracks 95, 96, 97, 98 and 99 in the track zone 94 on the magnetic tape 2 in FIG. 7, when the magnetic tape 2 is driven with a given tape speed v(D) in the forward direction 3 and the head support 9 is driven with a given speed n(D) in the direction indicated by the arrow 12.

Hereinafter, only those features of the video recorder 1 of FIG. 8 will be described which differ from those in the video recorders 1 of FIGS. 1 and 4.

In the video recorder 1 of FIG. 8, a magnetic tape 2 can be driven with the tape speed v(D)=v(N)=3.33 cm/s in the digital mode D and with the tape speed v(P)=2.34 cm/s in the analog mode A and the head support 9 and the rotationally drivable magnetic heads SP1, SP2, LP1, LP2, A1 and A2 can be driven with the speed n(D)=1800 r.p.m. and with the speed n(P)=1500 r.p.m. in the analog mode A.

The video recorder 1 of FIG. 8 has a terminal 105 at which the control information A/D is available by means of which the video recorder 1 of FIG. 8 is switchable between the analog mode A and the digital mode D, enabling analog video signals and analog audio signals to be recorded in and reproduced from inclined tracks by means of rotationally drivable magnetic heads in the analog mode, and digital video signals and digital audio signals to be recorded in and reproduced from inclined tracks by means of rotationally drivable magnetic heads in the digital mode.

The control information A/D at the terminal 105 serves to control or change over four change-over switches 106, 107, 108 and 108, which each have a first contact 110, 111, 112, 113, respectively, a change-over contact, 114, 115, 116, 117, respectively, and a second contact 118, 119, 120, 121. The switches 106, 107, 108 and 109 are each switchable between an analog position A shown in FIG. 8 as a broken line, and a digital position D shown in FIG. 8 as a solid line. The control information A/D at the terminal 105 further serves to control or change over the signal processing device 68, the signal processing device 32 and the control signal generation device 50 to activate these devices 68, 32 and 50 in accordance with the digital mode A or the analog mode A.

With respect to the control signal generation device 50 of the video recorder 1 of FIG. 8, it is to be noted that in the analog mode A, this control signal generation device 50 is adapted to generate an A-CTL signal in the recording mode R(A), which control signal appears at the output 52A of the control signal generation device 50, and in the digital mode D, this device is adapted to generate a D-CTL signal in the recording mode R(D), which control signal appears at the output 52D of the control signal generation device 50. The generated D-CTL signal may again be provided with signal markings as in the case of the D-CTL signal stored in the control signal track 26 on the magnetic tape 2 of FIG. 7. The signals markings may alternatively be brief additional pulses inserted in the signal intervals of the D-CTL signal.

With respect to the detection device 91 of the video recorder 1 of FIG. 8, it is to be noted that, in the same way as in the video recorder 1 of FIG. 4, in the reproduction mode P(D) of the digital mode D, the detection device 91 is connected to the second stationary magnetic head 25 by means of the change-over switches 108 and 85 via the change-over contact 116 and the second contact 120 of the switch 108 and via the change-over contact 86 and the second contact 87 of the switch 85. In this way, it is achieved that the presence of a reproduced D-CTL signal is detected with the detection device 91, after which the detection device 91 supplies the detection information D.

Moreover, in the reproduction mode P(A) of the analog mode A of the video recorder 1 of FIG. 8, the input 92 of the detection device 91 of the video recorder 1 of FIG. 8 is connected to the second stationary magnetic head 25. This connection is made from the second stationary magnetic head 25, via its terminal 56, and by means of the change-over switches 108 and 54 via the change-over contact 116 and the first contact 112 of the switch 108 and via the change-over contact 55 and the second contact 58 of the switch 54. In the case of the video recorder 1 of FIG. 8, the detection device 91 is also adapted to detect the presence of the A-CTL signal reproduced from the control signal track 26 on the magnetic tape 2 by means of the second stationary magnetic head 25 in the reproduction mode P(A) of the analog mode A. Moreover, the detection device 91 is now constructed in such a manner that upon detection of the presence of the reproduced A-CTL signal, it generates further detection information A, which is available at its output 93. The detection information A indicates that an A-CTL signal has been recorded in the control signal track 26 of a magnetic tape 2, which is the case if an analog video signal and, as the case may be, frequency-modulated analog audio signals have been stored in the inclined tracks, so that the detection information in fact indicates that a magnetic tape 2 loaded into a video recorder 1 is a magnetic tape with video signals and, if applicable, audio signals stored in analog form in inclined tracks on the magnetic tape 2.

When a magnetic tape 2 storing video signals and audio signals in digital form in inclined tracks is loaded into a video recorder 1 as shown in FIG. 8 and the video recorder 1 of FIG. 8 is in its digital mode D, the reproduced D-CTL signal is applied from the control signal processing device 57 to the frequency divider 88 via the change-over switch 109 and its frequency is divided by N=3 by the frequency divider 88, so that the speed control device in the power supply arrangement 31 compares the frequency-divided D-CTL signal with a nominal value corresponding to a customary digital reproduction mode, in such a manner that the magnetic tape 2 is driven with a correct tape speed and, as a consequence, the digital video signals and digital audio signals are reproduced correctly. However, if the video recorder 1 of FIG. 8 is in its analog mode A, the D-CTL signal reproduced from the control signal track 26 is applied from the control signal processing device 57 directly the power supply arrangement 31 with the speed control device via the change-over switch 109 directly and not via the frequency divider 88, in which speed control device it is compared with a nominal value, as a result of which the magnetic tape 2 will be driven with a tape speed which is too low in comparison with normal operation, which has the advantageous effects already described for the video recorder 1 of FIG. 4. These advantageous effects are also obtained when a magnetic tape provided with digital video signals and digital audio signals as well as a D-CTL signal in accordance with the invention by means of a video recorder 1 as shown in FIG. 8 is to be played back by means of a known video recorder 1 in accordance with the VHS standard as shown in FIG. 1.

It is to be noted that in the case that a reproduced D-CTL signal with signal markings is applied to the frequency divider 88 to divide its frequency, measures in the divider 88 have been or are taken to guarantee that the signal markings in the reproduced D-CTL signal do not affect the frequency division. This is important in order to avoid an incorrectly divided frequency as a result of this frequency division.

A video recorder 1 as shown in FIG. 8 may also be have features to ensure that the video recorder 1 is automatically set to its digital mode D when a magnetic tape 2 on which digital video signals and digital audio signals are stored in inclined tracks is loaded into the video recorder 1 in its analog mode A, and that the video recorder 1 is automatically set to its analog mode A when a magnetic tape 2 on which analog video signals are stored in inclined tracks is loaded into the video recorder 1 in its digital mode D.

The invention can be applied to other variants and is not limited to the two exemplary embodiments described above, of which the video recorder in accordance with the second embodiment is VHS compatible. It is to be noted in particular that there are a multitude of further possibilities for the choice of the length of a recorded signal period of the control signal, i.e., of the D-CTL signal.

What is claimed is:

1. A magnetic tape cassette having a tape in which adjacent inclined tracks extend obliquely relative to a longitudinal direction of the tape and in which a control signal track extends in the longitudinal direction of the tape, all in accordance with an analog VHS standard adopted by manufacturers of analog VHS equipment, wherein digital video and digital audio information are stored in the adjacent inclined tracks instead of analog signals and wherein the inclined tracks are scannable by means of rotationally drivable magnetic heads, each of the magnetic heads successively scanning inclined tracks that are spaced apart from each other in the longitudinal direction by a predetermined distance which relates successive tracks that are scanned by any particular one of the magnetic heads, comprising: a periodic control signal stored in the control signal track for automatically controlling tape speed during playback of the digital video and digital audio information by digital playback apparatus in accordance with a period length of the stored periodic control signal, the stored periodic control signal having a period length equal to said predetermined distance divided by N, where N is an integer greater than 1, whereby in the event that an analog VHS playback apparatus complying with said analog VHS standard attempts to play the magnetic tape cassette having digital video and digital audio information stored in the inclined tracks, said analog VHS playback apparatus automatically reads the control signal track and automatically controls tape speed in accordance therewith and an incorrect tape speed is produced by said analog VHS playback apparatus due to the period length of the stored periodic control signal in the control signal track, thereby avoiding undesirable audio output.

2. A magnetic tape cassette as in claim 1 wherein the stored control signal has signal edges, each of the signal edges being associated with a particular inclined track on the tape.

3. A magnetic tape cassette having a tape in which adjacent inclined tracks extend obliquely relative to a longitudinal direction of the tape and in which a CTL control signal track extends in the longitudinal direction of the tape, all in accordance with an analog VHS standard adopted by manufacturers of analog VHS equipment, said analog VHS standard defining a period length for a CTL signal in the CTL control signal track, wherein digital information is stored in the adjacent inclined tracks instead of analog VHS signals and further comprising: a periodic control signal stored in the CTL control signal track for automatically controlling tape speed correctly during playback of the digital information by digital playback apparatus, the stored periodic control signal having a period length that is different from the period length for a CTL signal defined by said analog VHS standard, the stored periodic control signal being readable as a CTL signal by an analog VHS playback apparatus complying with said analog VHS standard in the event that said analog VHS playback apparatus attempts to play the magnetic tape cassette having digital information stored in the inclined tracks, said analog VHS playback apparatus automatically controlling tape speed in accordance with the period length of the periodic control signal stored in the CTL control signal track to produce an incorrect tape speed when the tape is played back using said analog VHS playback apparatus, thereby avoiding undesirable audio output from said analog VHS playback apparatus.

4. Apparatus for recording digital video and digital audio information on a magnetic tape in adjacent inclined tracks which extend obliquely relative to a longitudinal direction of the tape, and in which a control signal track extends in the longitudinal direction of the tape for automatically controlling tape speed during playback of the tape in accordance with the period length of a periodic control signal stored in the control signal track, the magnetic tape being held in a magnetic tape cassette and the magnetic tape, the inclined tracks, the control signal track and the magnetic tape cassette all complying with an analog VHS standard adopted by manufacturers of analog VHS equipment, comprising: means for scanning the inclined tracks by means of rotationally drivable magnetic heads and recording digital video and digital audio information in the inclined tracks, each of the magnetic heads successively scanning inclined tracks that are spaced apart from each other in the longitudinal direction by a predetermined distance; and means for storing a periodic control signal on the tape in the control signal track, the stored periodic control signal having a period length equal to said predetermined distance divided by N, where N is an integer greater than 1, whereby the period length of the periodic control signal does not comply with said analog VHS standard in order that in the event the tape on which digital video and digital audio information is recorded is attempted to be played back using an analog playback equipment that complies with said analog VHS standard, an incorrect tape speed is produced by said analog playback equipment, thereby avoiding undesirable audio output from said analog playback equipment.

5. Apparatus for reproducing digital video and digital audio information recorded on a magnetic tape in adjacent inclined tracks which extend obliquely relative to a longitudinal direction of the tape, the inclined tracks being readable by means of rotationally drivable magnetic heads, each of the magnetic heads successively scanning inclined tracks that are spaced apart from each other in the longitudinal direction by a predetermined distance, said tape also having a control signal track extending in the longitudinal direction of the tape for automatically controlling tape speed during playback in accordance with a period length of a control signal stored in the control signal track, the magnetic tape being held in a magnetic tape cassette and the magnetic tape, the inclined tracks, the control signal track and the magnetic tape cassette all complying with an analog VHS standard adopted by manufacturers of analog VHS equipment, a control signal being stored in the control signal track and having a period length not complying with said analog VHS standard, the period length of the stored control signal being equal to said predetermined distance divided by N, where N is an integer greater than 1, said apparatus comprising: means for reading the control signal stored in the control signal track and for determining a control signal frequency thereof; and a frequency divider for dividing the determined frequency by N, the divided frequency being used to control tape speed during playback of the digital video and digital audio information recorded on the tape, whereby in the event that the tape is attempted to be played back by an analog playback equipment that complies with said analog VHS standard and reads the control signal track and determines a control signal frequency in order to control tape speed in accordance therewith, the determined control signal frequency will not be divided by N, thereby producing an incorrect tape speed that avoids undesirable audio output.

6. A magnetic tape cassette containing a tape in which adjacent inclined tracks extend obliquely relative to a longitudinal direction of the tape, the inclined tracks being scannable by means of rotationally drivable magnetic heads, and in which a control signal track extends in the longitudinal direction of the tape, the control signal track complying with an analog VHS standard adopted by manufacturers of analog VHS equipment for recording a CTL control signal for controlling tape speed during analog VHS playback, the magnetic tape cassette and the tape tracks structurally complying with said analog VHS standard so that the magnetic tape cassette and tape physically can be loaded into an analog VHS playback apparatus complying with said analog VHS standard, however wherein digital information is stored in the adjacent inclined tracks instead of analog signals, the tape further comprising: a periodic control signal stored in the control signal track for automatically controlling tape speed during playback of the digital information by digital playback apparatus, the stored periodic control signal having a period length equal to the distance by which two successive inclined tracks scanned by the same magnetic head are spaced apart in the longitudinal direction divided by N, where N is an integer greater than 1, whereby in the event that said analog VHS playback apparatus complying with said analog VHS standard attempts to play the magnetic tape cassette having digital information stored in the inclined tracks, said analog VHS playback apparatus incorrectly interprets the periodic control signal stored in the control signal track as a CTL signal and automatically drives the tape at an incorrect speed, thereby automatically avoiding undesirable and annoying acoustic output.

7. A magnetic tape cassette containing a tape in which adjacent inclined tracks extend obliquely relative to a longitudinal direction of the tape, and in which a control signal track extends in the longitudinal direction adopted by manufacturers of analog VHS equipment for recording a CTL control signal that controls tape speed during VHS playback, the magnetic tape cassette and the tape tracks geometrically complying with said analog VHS standard so that the magnetic tape cassette and tape physically can be loaded into an analog VHS playback apparatus complying with said analog VHS standard, however wherein digital information is stored in the adjacent inclined tracks instead of analog signals, the tape further comprising: a periodic control signal stored in the control signal track for automatically controlling tape speed during playback of the stored digital information by digital playback apparatus, the stored periodic control signal having a period length equal to a fraction of the period length of the CTL control signal specified by said analog VHS standard, whereby in the event that said analog VHS playback apparatus complying with said analog VHS standard attempts to play the magnetic tape cassette having digital information stored in the inclined tracks, said analog VHS playback apparatus incorrectly interprets the periodic control signal stored in the control signal track as a CTL signal and automatically drives the tape at an incorrect speed, thereby automatically avoiding undesirable and annoying acoustic output.

* * * * *

UNITED STATES PATENT AND TRADEMARK OFFICE
CERTIFICATE OF CORRECTION

PATENT NO. : 6,147,829
DATED : November 14, 2000
INVENTOR(S) : Jurgen H.T. Geerlings It is certified that error appears in the above-identified patent and that said Letters Patent is hereby corrected as shown below:

Column 24,
Line 21, change "adopted by manufacturers of" to -- of the tape and complies with an --.
Line 22, after "VHS" insert -- standard adopted by manufacturers of analog VHS --.

Signed and Sealed this

Twelfth Day of November, 2002

Attest:

JAMES E. ROGAN
Attesting Officer
Director of the United States Patent and Trademark Office